United States Patent [19]

Kanao

[11] Patent Number: 4,587,145
[45] Date of Patent: May 6, 1986

[54] FLEXIBLE HOSE

[76] Inventor: Shiro Kanao, No. 9-18, Nanpeidai 4-chome, Takatsuki-shi, Osaka, Japan

[21] Appl. No.: 671,836

[22] Filed: Nov. 15, 1984

[30] Foreign Application Priority Data

Jul. 31, 1984 [JP] Japan ................................ 59-161671

[51] Int. Cl.⁴ ............................................ F16L 11/08
[52] U.S. Cl. ...................................... 428/36; 138/129; 138/132; 138/154; 138/174
[58] Field of Search .................. 428/36; 138/132, 129, 138/144, 153, 174, 133, 122, 147, 150, 154

[56] References Cited

U.S. PATENT DOCUMENTS 3,112,771 12/1963 Bringolf ............................. 138/132
3,885,594 5/1975 Tanaka ............................... 138/132

Primary Examiner—John E. Kittle
Assistant Examiner—Thomas C. Saitta
Attorney, Agent, or Firm—Sughrue, Mion, Zinn, Macpeak, and Seas

[57] ABSTRACT

A flexible hose composed of a membrane which comprises soft and hard strip members alternatively disposed in a spiral form. A connector element is disposed to extend through the center of the thickness of the soft strip member and bilaterally of the hose in its axial direction. Both the projected portions of the connector element and the hard strip members adjacent the soft strip member are interconnected.

17 Claims, 10 Drawing Figures

FLEXIBLE HOSE

BACKGROUND OF THE INVENTION

This invention relates to a flexible hose composed of a membrane which comprises soft and hard strip members alternately disposed in a spiral form. Self-support and shock-resistance are ensured and also excellent flexibility is obtained.

Within this technology it has heretofore been proposed to make a flexible hose of this type as shown in FIGS. 1 and 2. This hose has soft and hard synthetic resin strips 51 and 52 which are alternately disposed on the outer periphery of a tubular web 50 of fiber or the like to integrally join one to the other, as seen in FIG. 1.

This conventional hose renders the tubular web 50 susceptible to the influence of fluid substances therein. The web is easily worn out or torn. This will greatly imperil functionality because of extension of the soft synthetic resin 51 by the tubular web 50 in the axial direction of the hose. As a result, the soft synthetic resin 51 is subjected to elastic and extensional deformation to a great extent when tensile force is applied to the hose. This dynamic characteristic shortens the hose life by repetition of such elastic deformation.

In order to eliminate this disadvantage, Japanese patent examined publication No. 8965/74, and Japanese utility model examined publication No. 30787/81, provide, for instance, a series of splicing yarn members along the axial direction of the hose in the center of the thicknesses of the soft and hard synthetic resins 51, 52 as shown herein in FIG. 2. This technique enables the hose to prevent the splicing yarn members from being worn away by fluid substances in the hose. They involve, however, a further difficulty in decreasing the strength since bonding forces are non-uniform by insertion of the splicing yarn members 53 between synthetic resin portions 51a, 51b and 52a, 52b as helically wound and diametrically divided from the soft and hard synthetic resins 51, 52.

SUMMARY OF INVENTION

This invention is an improvement over those prior art devices. It comprises a hose that not only offers an improvement in strength but also an increase in hose life.

The hose, according to the invention, is characterized by a structural arrangement made so that a connector element is disposed to extend through the center of the thickness of the aforementioned soft strip member and spiral wound on the hose. Both the projected portions of the connector element and hard strip members adjacent the soft strip member are interconnected.

More specifically, the connector element for controlling the width of the soft strip member in the axial direction of the hose is disposed in the center of the thickness of the soft and hard strip member to avoid imperilment and loss of width control function due to wear of the connector element. Further, in the hard strip member, attachment is achieved by connecting both the projected portions of the connector element which passes through the soft strip member. For this reason, a diametric division of the hard strip member is not required and bonding forces for the hose membrane as a whole may be increased as much as possible.

Thus, in accordance with this invention, an improvement is achieved in such a manner that only the aforementioned connector element is mounted on the soft strip member to which the concentrated stress of elongation is applied, thereby improving strength of the hose and obtaining its long life.

BRIEF DESCRIPTION OF THE DRAWING

FIGS. 3 through 6 illustrate a preferred embodiment of the elastic hose according to the invention wherein;

FIG. 3 is a front elevation of the hose as half-finished with parts broken away;

FIG. 4 is an enlarged sectional view of the finished hose;

FIG. 5 is a plan view of the soft strip member with parts broken away;

FIG. 6 is a seotion taken along the line VI—VI of FIG. 5; and

DESCRIPTION OF THE PREFERRED EMBODIMENT

Figure 1:
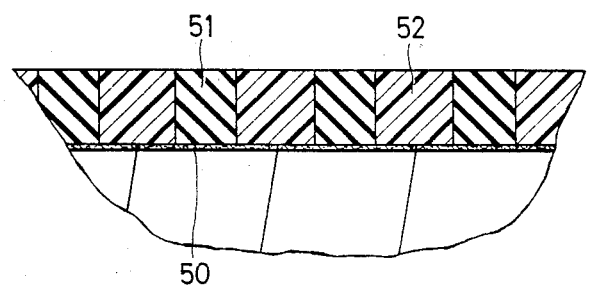
FIGS. 1 and 2 are an enlarged section and a front view with a part broken away showing the major portions of the conventional hoses, respectively.
Figure 2:
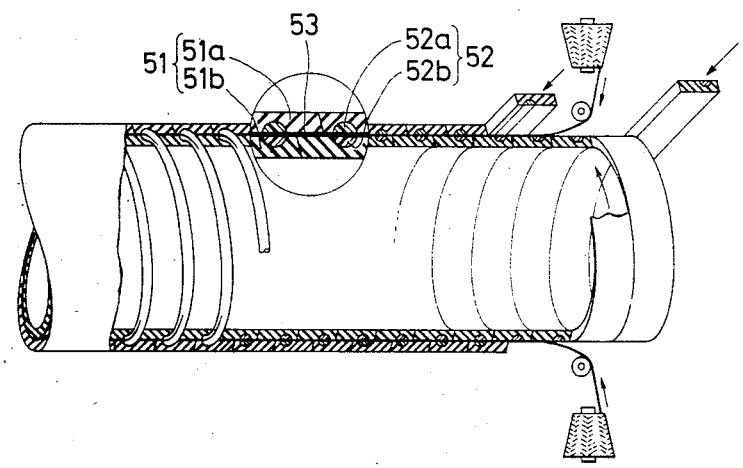
Figure 3:
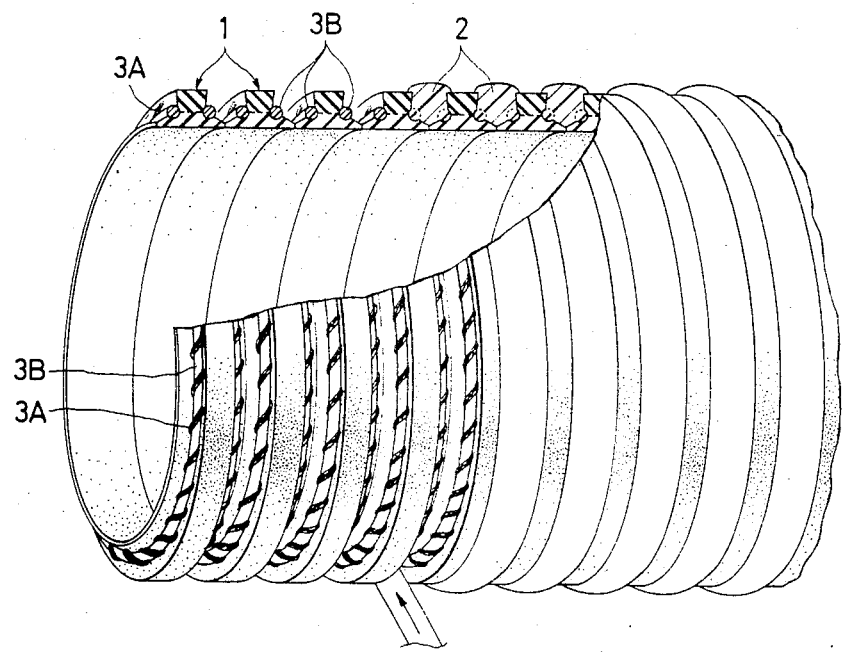
Figure 4:
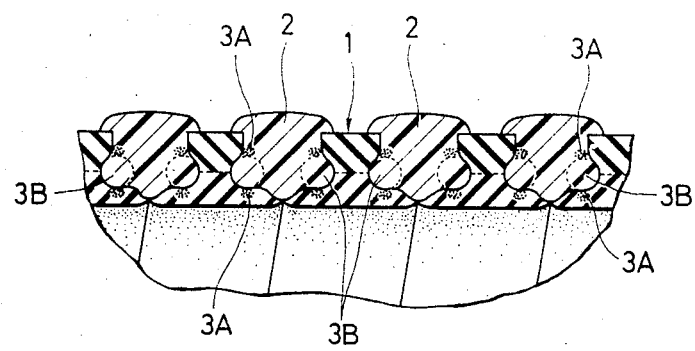
Figure 5:
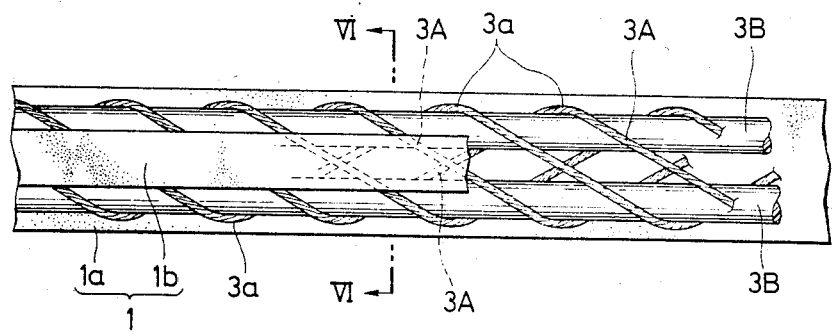
Figure 6:
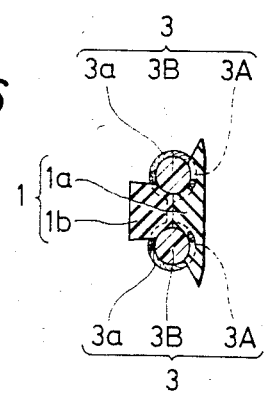

As shown in FIGS. 3 through 6, the flexible hose of this invention is composed of the hose membrane which is obtained by alternately disposing in a spiral form vulcanized rubber as an example of component of the soft strip member 1 and hard synthetic resin such as polyethylene or polypropylene as an example of component of the hard strip member 2. The connector element 3 is disposed to extend through the center of the thickness of the soft strip member 1 and spiral wound on the hose. Both the projected portions 3a of the connector element 3 and the hard strip members 2 adjacent the soft strip member 1 having the hard strip member are interconnected.

The soft strip member 1 is integrally formed in a condition to hold the connector element 3 between one soft strip portion 1a and the other soft strip portion 1b (FIG. 6) located centrally of the outer periphery of the first-mentioned soft strip portion.

The connector element 3 is in a spiral form in the soft strip member 1 and comprises an inextensible, flexible string member 3A of vinylon or nylon yarn on which portions 3a each bent into a U-shape are sewed with projections extending outside of the soft strip member 1. Hard rod members 3B are formed of the same material as the hard strip member 2 and are inserted through and held along the U-shaped projections 3a of the flexible string member 3A.

The pair of hard rod members 3B are formed to integrall fuse with the hard strip member 1 when they are molded.

The soft strip member 1 may be also employed to have the inner periphery of the hard strip member 2 coated therewith.

Other embodiments of this invention, in terms or choice of materials and/or configuration will now be described. The string member 3A need not be vinylon or nylon yarn. Alternatively, a steel or fiber wire and the like other than as described and shown in the first embodiment can be used as the flexible string member 3A.

The hard rod members 3B need not be formed of the same material as the hard strip 2. Alternatively, a steel wiremultifilament yarn assembly and the like other than as illustrated and described in the first embodiment can be used as the hard rod members 3B.

Figure 7:
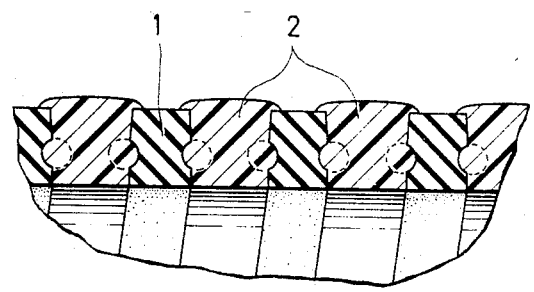
FIGS. 7 through 10 are enlarged sections showing the major portions of different embodiments.

As shown in FIG. 7, the hard strip member 2 may be adapled to have its inner periphery exposed to the interior of the hose. In this modifioation, the hard strip extends from the outer surface inwardly to form an inner wall portion of the hose.

Figure 8:
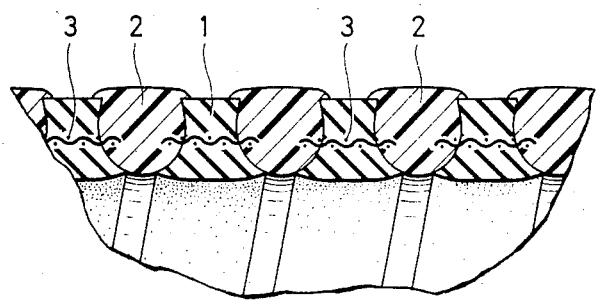

As shown in FIG. 8, the connector element 3 is made of hard materials such as metal steel or punching metal. The connector element extends axially to link the hard strip member 2 via connector 3.

Figure 9:
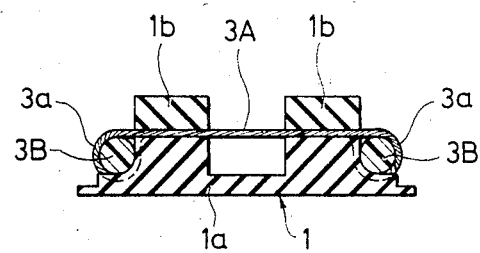

As is apparent from FIG. 9, the soft strip member 1 may be integrally formed by holding the connector element 3 between the one soft strip portion 1a and the two soft strip portions 1b disposed on the outer periphery thereof an spiral wound on the hose.

Figure 10:
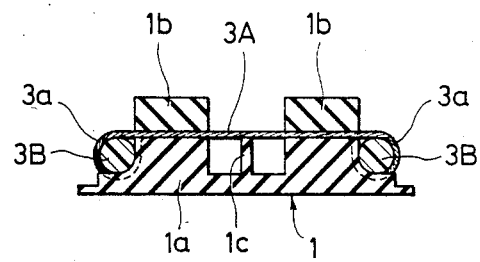

Another modification is illustrated in FIG. 10. The soft strip member 1 is integrally formed by holding the connector element 3 between the one soft strip portion 1a and the two soft strip portions 1b disposed on the outer periphery thereof and bilaterally of the hose in its axial direction. On the other hand the projection 1c is integrally formed between the outer soft strip portions 1b to abut against the projection and prevent the flexible string member 3A from being suspended over a significant distance without support.

While this invention has been described relative to its preferred embodiments and modifications, it is apparent that other modifications may be practiced without departing from the essential scope of this invention.

I claim:

1. A flexible hose comprising:
a membrane having soft and hard strip members alternatively disposed in a spiral form, a connector element disposed through the center of the thickness of said soft strip member and spiral wound on the hose, said connector element having a plurality of projected portions, and; said projected portions and said hard strip adjacent said soft strip member being interconnected.

2. A flexible hose as set forth in claim 1 wherein said soft strip member is integrally formed to hold said connector element between one soft strip portion and another soft strip portion located centrally of the outer periphery of the first soft strip portion.

3. A flexible hose as set forth in claim 1 wherein said soft strip member is integrally formed to hold said connector element between said first soft strip portion and two soft strip portions disposed bilaterally of the hose therearound in its axial direction.

4. A flexible hose as set forth in claim 1 wherein said connector element is made of the same material as said hard strip members.

5. A flexible hose as set forth in claim 2, wherein said connector element is made of the same material as said hard strip member.

6. A flexible hose as set forth in claim 3, wherein said connector element is made of the same material as said hard strip member.

7. A flexible hose as set forth in claim 1, wherein said connector element is composed of an inextensible, flexible string member disposed to spirally extend through said soft strip member, and hard rod members arranged inside the spiral of said flexible string member.

8. A flexible hose as set forth in claim 2, wherein said connector element is composed of an inextensible, flexible string member disposed to spirally extend through said soft strip member, and hard rod members arranged inside the spiral of said flexible string member.

9. A flexible hose as set forth in claim 3, wherein said connector element is composed of an inextensible, flexible string member disposed to spirally extend through said soft strip member, and hard rod members arranged inside the spiral of said flexible string member.

10. A flexible hose as set forth in claim 7 wherein said flexible string member is vinylon yarn.

11. A flexible hose as set forth in claim 7 wherein said flexible string member is nylon yarn.

12. A flexible hose as set forth in claim 7 wherein said hard rod members are formed of the same material as said hard strip member.

13. A flexible hose as set forth in claim 1 wherein said soft strip member is soft resin.

14. A flexible hose as set forth in claim 13 wherein said soft resin is vulcanized rubber.

15. A flexible hose as set forth in claim 1 wherein said hard strip member is hard synthetic resin.

16. A flexible hose as set forth in claim 15 wherein said hard synthetic resin is polyethylene.

17. A flexible hose as set forth in claim 15 wherein said hard synthetic resin is polypropylene.

* * * * *